United States Patent [19]
Gordon

[11] Patent Number: 4,975,729
[45] Date of Patent: Dec. 4, 1990

[54] ELECTRONIC PRINTER USING A FIBER OPTIC BUNDLE AND A LINEAR, ONE-DIMENSIONAL LIGHT SOURCE

[75] Inventor: Eugene I. Gordon, Summit, N.J.

[73] Assignee: Photon Imaging Corp., Edison, N.J.

[21] Appl. No.: 468,833

[22] Filed: Jan. 22, 1990

[51] Int. Cl.$^5$ ............................................. G03B 27/00
[52] U.S. Cl. .................... 355/1; 250/227.23; 346/160; 350/96.25; 358/300
[58] Field of Search .......... 355/1; 250/227.23, 227.26, 250/227.11; 350/96.24, 96.25; 346/160; 358/200, 300

[56] References Cited

U.S. PATENT DOCUMENTS

| | | | |
|---|---|---|---|
| 4,297,022 | 10/1981 | Lester | 355/1 X |
| 4,367,946 | 1/1983 | Varner | 355/1 X |
| 4,478,504 | 10/1984 | Tanaka | 355/1 |
| 4,564,866 | 1/1986 | Comberg | 355/1 X |
| 4,640,601 | 2/1987 | Deguchi et al. | 355/1 X |
| 4,653,895 | 3/1987 | Deguchi et al. | 355/1 |
| 4,674,834 | 6/1987 | Margolin | 350/96.25 |
| 4,702,552 | 10/1987 | Margolin | 355/1 X |
| 4,727,380 | 2/1988 | Miura et al. | 346/108 |
| 4,743,089 | 5/1988 | Sakakibara et al. | 355/1 X |
| 4,748,680 | 5/1988 | Margolin | 355/14 |
| 4,752,806 | 6/1988 | Haas et al. | 355/1 X |
| 4,760,421 | 7/1988 | Margolin | 355/1 |
| 4,791,494 | 12/1988 | Schaefer | 358/300 |

FOREIGN PATENT DOCUMENTS 60-254126 12/1985 Japan.

*Primary Examiner*—Richard A. Wintercorn
*Attorney, Agent, or Firm*—Herbert M. Shapiro

[57] ABSTRACT

An electronic printer, comprising a fiber optic bundle having the fiber ends organized in a linear array in a first face and in an area array in a second face, includes a linear array of LEDs or LCSs adapted to image light into the fiber ends in one linear segment of the area face at a time. A rotating mirror is operative to move the light image onto each of the consecutive linear segments on the area face and to provide a digital signal indicative of the position of the light image in each instance. The arrangement provides a low cost, high speed, and small size electronic printer which is easily adapted to high resolution and color printing.

22 Claims, 5 Drawing Sheets

ELECTRONIC PRINTER USING A FIBER OPTIC BUNDLE AND A LINEAR, ONE-DIMENSIONAL LIGHT SOURCE

FIELD OF THE INVENTION

This invention relates to electronic printers and more particularly to such printers utilizing a plurality of light conduits such as a bundle of optical fibers.

BACKGROUND OF THE INVENTION

U.S. Pat. No. 4,760,421 issued Jul. 26, 1988, and now assigned to the assignee of the present application discloses an electronic printer which utilizes a noncoherent bundle of optical fibers. The fiber ends at one face of the bundle are organized in a linear array. The ends of the same fibers in a second face are organized in an area array which may be, for example, rectangular, square or circular. There is no predetermined relationship between the fiber positions in the linear array face and those in the area array face. Consequently, the bundle is noncoherent.

The fiber bundle is used to transmit light from an array of light sources optically coupled to the area array face of the bundle to, for example, photosensitive, photographic, or electrophotographic medium coupled to the linear array face of the bundle. Each of the fibers in the linear array face represents a pixel in a line of pixels. Illustratively, the light source comprises a cathode ray tube (CRT) operative to generate a localized area of light at each of a sequence of electron beam addresses on the face plate of the tube which is coupled to the area array face and produces the desired sequence of pixels generated at the linear face of the bundle.

The sequence of tube face plate addresses which corresponds to the sequence of pixels in the linear array face of the fiber optic bundle is obtained in accordance with the above-mentioned patent, during an initialization procedure in which light is introduced into individual fibers in the area face of the bundle by a CRT, and a photosensor is moved incrementally along the linear face of the bundle. Illustratively, the photo-sensor is covered by an opaque hood with a narrow transparent slit in it. The slit is narrow compared to a fiber diameter and is moved in increments also small compared to a fiber diameter. Light passing through the slit is incident on the photosensor. This procedure results in the photosensor measuring light unambiguously from only one fiber at a time.

A CRT is used to direct electrons to each of the preestablished beam addresses on the face plate while the photosensor is stationary at a selected position in the linear face. When the photosensor indicates the presence of light in the fiber, the set of electron address for which light appears in the fiber is associated with the photosensor slit position, in each instance, to determine the correspondence between the electron addresses and a pixel position (presumably a fiber end) in the linear face. An optimum address for each pixel is chosen from each set. Because the photosensor is moved from pixel position to consecutive position, a sequence of associated addresses is thus obtained. The resulting table of pixel positions vs. electron beam addresses is stored in a PROM which is interrogated during normal operation of the printer. The interrogation of the sequence of addresses occurs each time a line of pixels is to be generated.

Pixels are excited, at the positions so obtained, during normal operation of the printer, to discharge, for example, consecutive (imaginery) linear segments of a moving electrostatic drum or belt in an electrophotographic process. The discharged medium containing an electrostatic image moves past toner, transfer, and fixer stations in a manner common to commercially available xerographic copiers, to transfer the electrostatic image, so created, to plain paper.

The CRT useful in such a printer is relatively small, essentially about the size of a conventional cigar. The face plate for such a CRT advantageously comprises a disc of small diameter optical fibers. The area face of the fiber optic bundle is abutted against or optically coupled to the fiber optic face plate and permanently fixed in position with respect to the face plate so that light generated at a selected one of the face plate addresses enters the end of a fiber in the area face of the bundle and excites a corresponding pixel in the linear face.

Although CRT's of this type are available commercially, they are made in relatively small quantities at present and thus are relatively expensive. They are presently used primarily for head-up displays in military vehicles. Stability of the electron beam position typically requires elaborate feedback control in such equipment.

BRIEF DESCRIPTION OF AN EMBODIMENT OF THIS INVENTION

Two dimensional commercial displays are available which use a linear array of light emitting elements to define a horizontal sequence of pixels within a row with mechanical deflection to achieve a vertical sequence of rows to simulate a two-dimensional array. Because the TV field rate in the U.S. is 60 fields per second, a vertical scan rate of 60 per second is implied and not excessive for mechanical scanners. Such arrangements produce useful TV, computer and helmet mounted displays.

It has been recognized that light signals generated at the addresses determined during an initialization procedure may be generated at the same time rather than in sequence. In accordance with the principles of this invention, the above-noted linear scan display technique is adapted to replace the CRT of the printer arrangement of U.S. Pat. No. 4,760,421 mentioned above to provide, not only the option to generate light signals on a flying spot basis as in a CRT, but also on a basis of all light signals of a line being generated simultaneously. The invention specifically is directed at a printer which includes a fixed linear array of discrete light-generating elements which is relatively inexpensive, relatively small and low power, and can be assembled from commercially available components. An advantage of such an array is that the geometric position of a spot of light projected onto the area face of the fiber bundle is invariant and is determined digitally. The size of the spot is also invariant.

The adaptation includes a digitizing arrangement for the movement of the image of the linear array through a sequence of reproducible vertical positions to achieve the equivalent of a two-dimensional field of discrete light sources. The adaptation also includes a unique initialization procedure which relates the addresses for the light generating elements of light patterns introduced at an area face of a fiber optic bundle to pixel positions at a linear opposite face of the bundle.

The use of a linear, light-generating array with a fiber optic bundle in a printer with a continuously moving photosensitive medium as disclosed herein with a noncoherent fiber optic bundle would be expected to exhibit vertical tearing. This phenomenon occurs when a vertical line of pixels is displaced relative to an adjacent vertical line. Vertical tearing occurs whenever adjacent pixels on a horizontal line are transmitted through the bundle non sequentially or non simultaneously and because the photosensitive medium moves vertically as those pixels are transmitted. In this invention, adjacent pixels in a linear horizontal segment (of the image) are not transmitted through the fiber bundle consecutively. Hence, possibly unacceptable vertical displacement of adjacent pixels could be expected to occur.

In accordance with the principles of the present invention, a linear array of light sources such as a linear light emitting diode (LED) array or liquid crystal shutter (LCS) array is imaged onto a linear segment (i.e. aligned with one axis) of the area face of a fiber optic bundle. The reason a linear array of light sources can be used with a noncoherent fiber optic bundle despite the potential for vertical tearing is that the opposite ends of those fibers, which have ends which are adjacent in the linear end of the bundle, are typically positioned relatively close together in the area face as will be discussed more fully below. Because of the row sequential operation of the light sources, these fibers are excited close together in time and relative vertical displacement of adjacent pixels in the linear array face can be kept to an insignificant amount. Thus, vertical tearing does occur, but it is not visible to the eye. Further, judicious selection and timing of the light-emitting source corresponding to a fiber end in the area face of the fiber optic bundle permits compensation for any distortions due to tearing.

Advantageously, the area face of the bundle is organized in a rectangular geometry, illustratively a random arrangement nominally almost ninety fibers wide by thirty fibers high, for a 2550 element linear fiber array suitable for a three hundred dot per inch resolution over eight and one half inch wide output common to presently-available, commercially available printers. The 256 LED or LCS linear array is imaged onto consecutive (imaginery) linear segments of the area face by a lens system and a moving mirror. The light from the LED or LCS linear array is turned off between each linear segment to permit entry of data for the LED or LCS from memory for the next linear segment before movement of the image to the position of the next linear segment occurs. Then appropriate elements in the linear array are turned on simultaneously to inject light into the appropriate fibers of the area array face. The photosensitive medium, although moving, is for all practical purposes, made stationary as the light spots are mirrored consecutively onto the consecutive linear segment in the rectangular face of the fiber optic bundle.

The light spots corresponding to the totality of fibers in the linear end of the fiber optic bundle are generated during the time the mirrored image moves vertically through, for example, 100 discrete horizontal rows. This number actually corresponds to several times the nominally thirty (virtual) rows of fibers in the area face of the bundle for the above-mentioned assumed number of fibers for reasons that will became clear hereinafter. We will adopt the convention that the width of the rectangular area face is along an x-axis (the height is along a y-axis) and the image of the linear LED or LCS array is moved along the y-axis. For each such position of the mirror, the precise y-axis position of the mirrored image is determined conveniently by a single large area sensor or a linear array of photosensors positioned along the y-axis of the area face of the bundle. This large area photosensor is, for example, covered by a series of transparent and opaque lines positioned in the path of the mirrored image of an index LED or LCS which is continuously on. The mirrored light of the index source impinges on the grid in a manner to identify the y-axis position of the image of the linear array during the initialization procedure, thus providing a digital (y axis) position code for the light generated by the LCS or LED array.

The LCS is operative as a shutter of light generated by a backside lamp. The LCS array thus shutters all the light from the lamp selectively. The individual elements in the LCS array shutter light otherwise occuring at associated addresses in the area face of the fiber optic bundle selectively during the time period when the LCS image is at a particular vertical position.

An initialization procedure to obtain the LCS or LED array addresses associated with the sequence of pixels in the linear face of the fiber optic bundle is obtained, in accordance with the present invention, conveniently by activating all the LCS or LED elements, for example, and then rotating the mirror through the succession of (y) positions corresponding to the linear segments of fibers of the bundle. The LCS or LED element addresses are ascertained for each vertical position corresponding only to the positions of maximum light intensities rather then to all the addresses as described above. During the initialization procedure, an individual light source usually is illuminated for more than one vertical position and consecutive y positions may overlap one another.

The light source addresses so determined are placed in proper sequence by moving the hooded photosensor to consecutive maximum intensity positions in the linear array face. At each position for the photosensor, light is generated at all of the "maximum intensity" addresses in succession until the photosensor detects light. The horizontal and vertical addresses of each source of light are stored in a look up table along with the corresponding position of the photosensor. The photosensor is then moved to the next maximum intensity position and the process is repeated. Thus, the proper sequence of addresses is determined to correspond to the sequence of "pixels" encountered by the photosensor as it is moved along the linear face. A linear array of photo sensor cells such as a chargecoupled device may be operated electronically to function as a moving slit during an initialization procedure by interrogating the cells sequentially (one at a time).

DETAILED DESCRIPTION OF AN ILLUSTRATIVE EMBODIMENT OF THIS INVENTION

Figure 1:
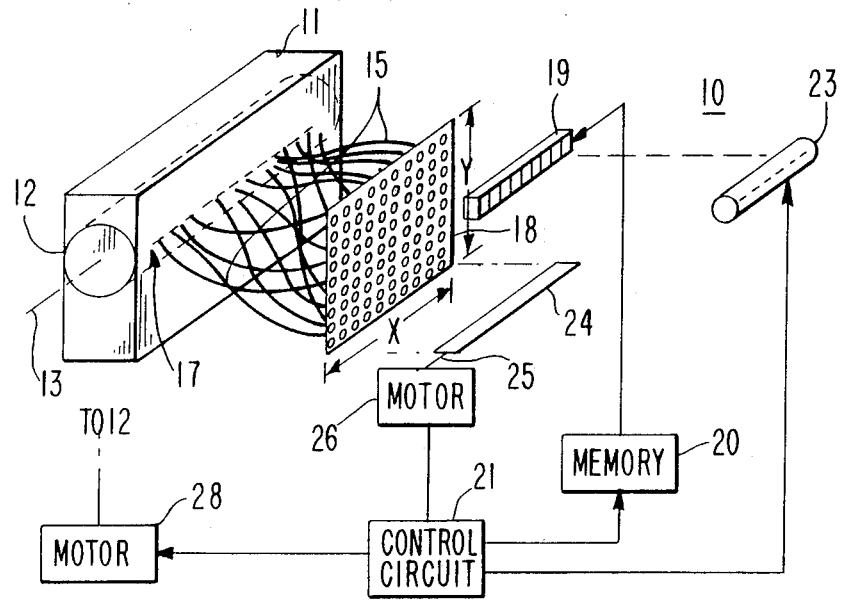
FIG. 1 is a representative block diagram of a printer engine in accordance with this invention.

FIG. 1 shows a printer engine assembly 10 in accordance with the principles of this invention. The assembly comprises an image formation subassembly and an optical subassembly.

The image formation subassembly is represented as box 11. Box 11 comprises an illustrative, and commercially available, xerographic module including on electrostatic drum or belt, a toner station, a transfer station and a fixer station. This subassembly operates in a manner well understood in the art to transfer to plain paper a charge image formed on the electrostatic medium by optical exposure. The optical subassembly is operative to develop the charge image on the electrostatic medium. The electrostatic medium is represented by cylinder 12 and is adapted to rotate about axis 13 as shown.

The optical subassembly for forming the charge image on medium 12 includes a fiber optic bundle shown encompassed by imaginary tie 15. The fiber ends are arranged linearly in a first face 17 of the bundle and arranged illustratively in a rectangular geometry in a second face 18. The area face can be represented as having x and y axes with the fibers arranged roughly in rows along the x axes. These rows are imaginary and the row representation is used for simplifying the description only. It will become clear that the fibers are not usually in rows (or columns) but that it does not matter in any case.

The illustrative optical subassembly also includes a linear array 19 of liquid crystal shutters (LCS's) operative as light valves. The image of the array 19 extends across the entire x axis of the area face of the fiber optic bundle. Array 19 also includes a number, N, of LCS devices which is large compared to the number, S, of fibers along the x axis of the area face of the bundle. Thus, for a 300 dpi resolution across on eight and one half inch page, a rectangular (but random) array of fibers approximately 30×90 is used where the ninety fibers are positioned along the x axis and the thirty fibers are positioned along the y axis, the fiber positions being entirely random and not actually occurring in rows or columns. In this instance, a linear array of LCS's would include perhaps 256 individual shutter elements. The excess number of elements over the number of fibers in the row will be seen to be important as explained below.

Linear array 19 is operated as a line of individual light valves shuttering light according to data applied to it. Thus, an output of memory 20 is connected to array 19 and is operative to shift a set of data into array 19 under the direction of control circuit 21. Light, for LCS embodiments, is provided by a backplane lamp 23 and is selectively shuttered by the LCS device.

Any light exiting LCS array 19 is directed at a mirror 24. Mirror 24 is rotated about its axis 25 by a motor 26 also under the direction of control circuit 21. Axis 25 is aligned with the x axis of area face 18 of the fiber optic bundle. Thus, when mirror 24 is rotated through a succession of positions, the light from LCS array 19 is imaged onto consecutive y positions of the linear segments of the area face where the long dimension of each linear segment is parallel to the x axis of the area face.

It was noted above that there is an excess number of shutter elements in array 19 over the number of fibers along the x axis of area face 18. Mirror 24 also is rotated in a manner so that memory 20 operates to move pixel data into the LCS array 24 many times, say 100 times, during the rotation of the mirror over the area face. Thus, there are perhaps three times as many vertical addresses as there are fibers in the columns. The number 100 rows times 256 elements per row (25,600) is approximately ten times as many (xy) addresses at which light is generated than there are fibers in area face 18. This means that there are about ten addresses dedicated for each fiber. An initialization procedure need select only one series of addresses for each fiber (one address if sufficient light is provided) and is operative to determine the series of addresses at which a maximum in light intensity occurs in each instance. The factor 10 insures that this is so. Thus, the constraints on the positioning of fibers in rows and columns in the area face are quite relaxed and, in practice, are totally disregarded and its fibers can be organized entirely at random. This is important to achieve a low cost fiber bundle. At least one address is selected from each series of addresses corresponding to a single fiber, the choice being made to compensate for tearing.

Control circuit 21 also controls a motor 28. Motor 28 drives electrostatic medium 12 with which all the functions of the image-formation sub-assembly are synchronized in a well known manner. Thus, it is clear that control circuit 21 moves the electrostatic medium properly in synchronism with the movement of mirror 24 to achieve a vertical pixel height approximately equal to the pixel width.

Figure 2:
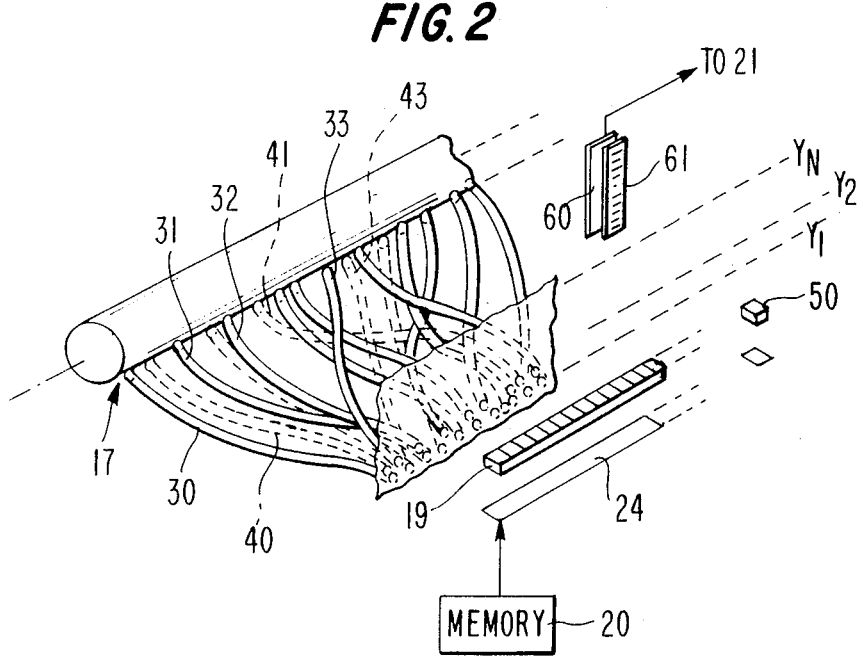
FIG. 2 is an expanded representation of a portion of the engine of FIG. 1.

FIG. 2 shows an enlarged fragment of the electrostatic medium coupled to a corresponding fragment of the fiber optic bundle. The fibers 30, 31, 32, 33,—shown by solid lines, all originate at the same row ($y_2$) in FIG. 2. It should be noted that the ends of these fibers at linear end 17 are in no predictable positions there. Similarly, fibers 40, 41, 42, 43—originate at row $y_1$ in area face 18 and again assume no predictable positions in linear end 17. Yet because of the address sequence determination of the initialization procedure and because of the excess numbers of addresses over fibers and because the y-axis address is determined digitally and because the x-axis position of the LCS in the array 19 is known, the memory operates to provide the proper pixel data for each pixel at linear end 17 of the fiber optic array even though that array is totally noncoherent.

The y-axis address vector is determined conveniently by including an extra index element in array 19. The extra index element is designated 50 in FIG. 2. The extra element is termed "extra" because it does not correspond in position to any portion of area face 18 of the fiber optic bundle. Rather, the light exiting element 50 is directed onto a single sensor 60 through a mask 61. Mask 61 includes a grid of opaque and transparent spaces (an optical grating) which responds to the position of the light exiting element 50 to represent the y-axis address vector corresponding to the image of the linear light source array. Alternatively, sensor 60 may comprise, for example, a photosensor array to provide the y-axis vector for each image position. Such an arrangement does not require mask 61. The x and y addresses for each pixel are determined during the initialization procedure and stored in a PROM considered part of control circuit 21. The operation of the PROM is analogous to that of its counterpart in the above-noted patent.

Figure 3:
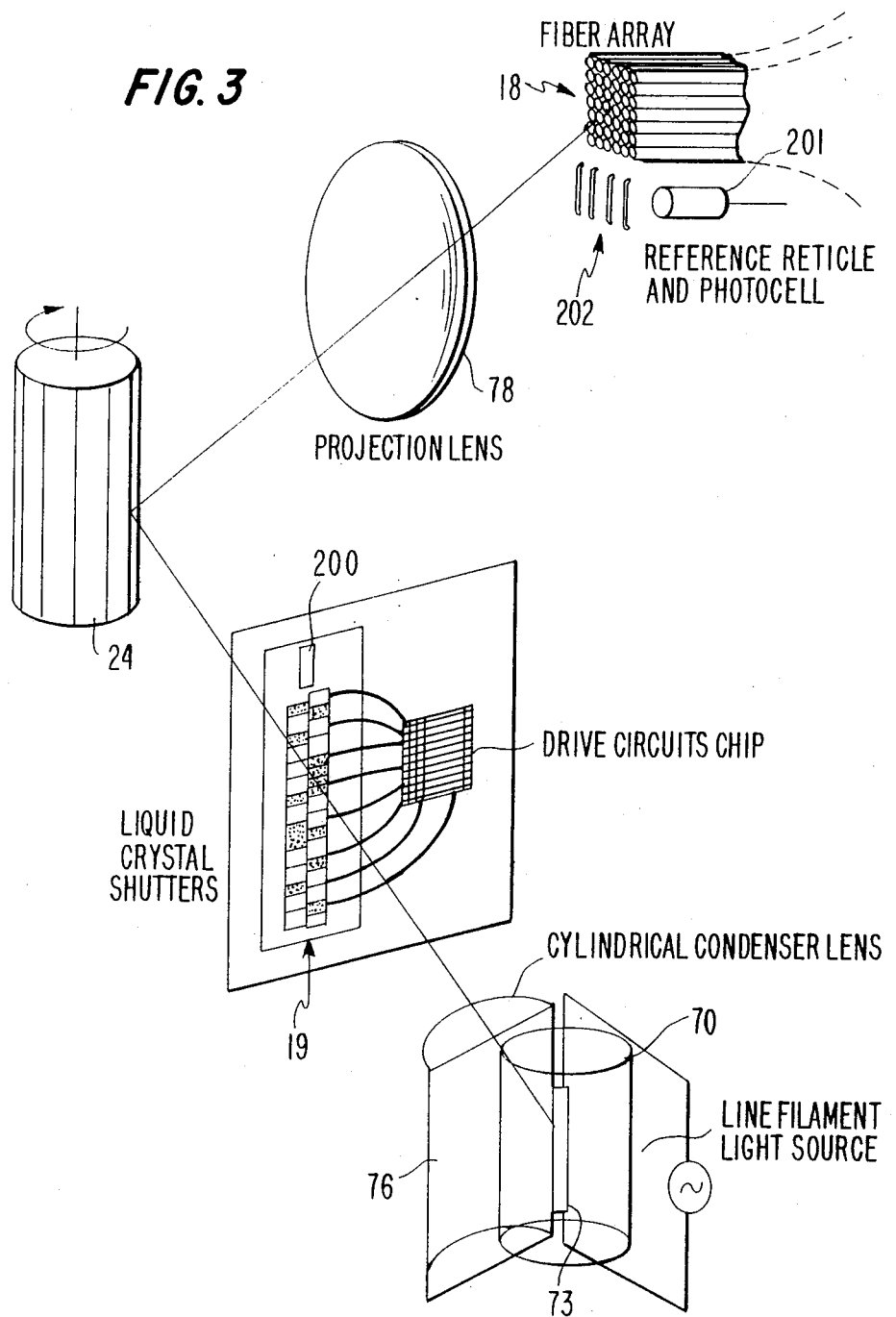
FIG. 3 is a schematic representation of the components of the engine of FIGS. 1 and 2.

FIG. 3 shows a schematic representation of the various elements of the optical subassembly of FIG. 1. Lamp 70 is shown as having a filament 73. The subassembly also includes a reflector or metallized coating (not shown) used (in practice) to double the light introduced into the system by the lamp. Light from lamp 70 is transmitted by condensing lens 76 to LCS array 19. The light pattern passing LCS array 19, in each instance, is directed to the mirror (24) for reflection onto a linear segment of the area face 18 of the fiber optic bundle through projection lens 78.

Figure 4:
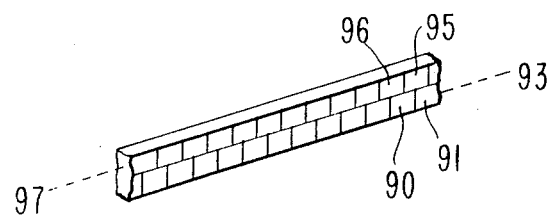
FIGS. 4 and 5 are representative block and expanded detail views of a component of the engine of FIGS. 1 and 2.
Figure 5:
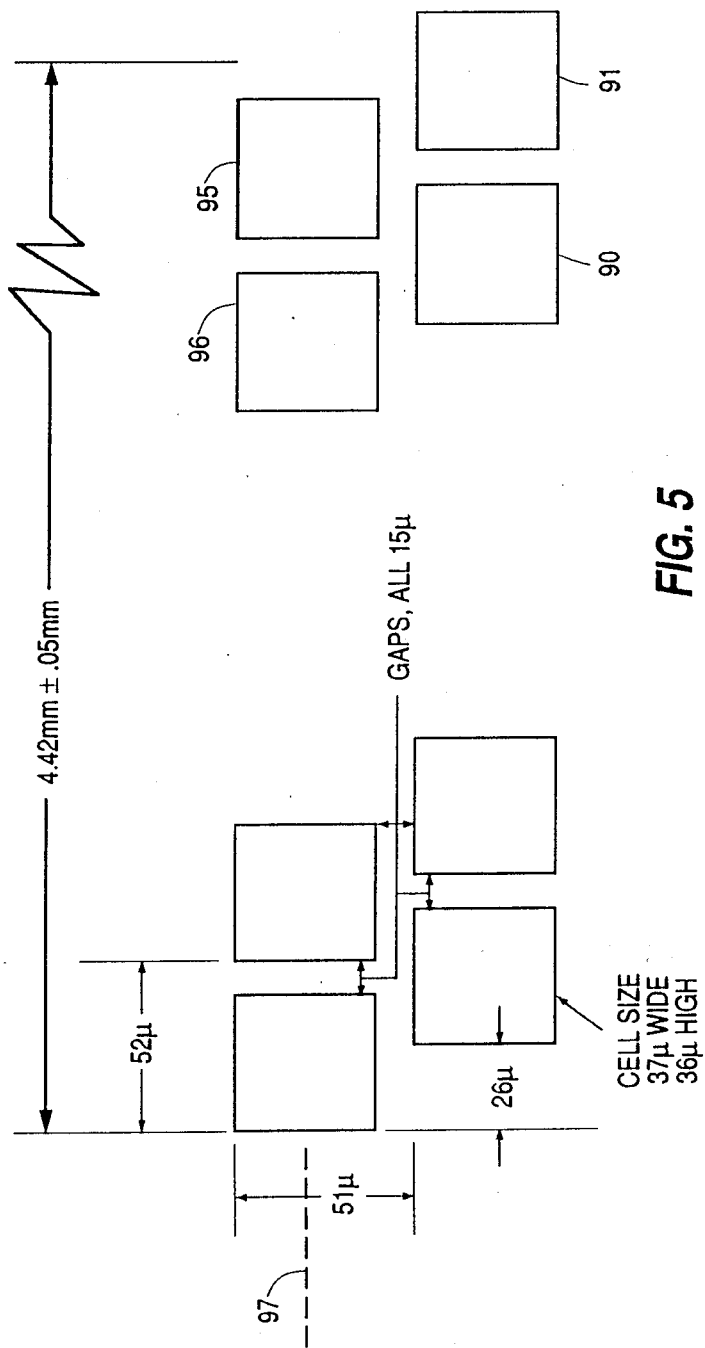

LCS array 19 has been described as a single linear array of liquid crystal light valves. In practice, array 19 might be arranged in other than a single linear row, for example, in two rows assembled like bricks in a wall where the bricks of one row are offset one half brick from the bricks in the next row. The arrangement is shown in FIGS. 3 and 4 where elements 90 and 91 in row 93 are shown offset from elements 95 and 96 in row 97. FIG. 5 shows the array in greater detail showing an LCS cell size of 37 $\mu$ wide by 67 $\mu$ high and intercell gaps of 11.15 $\mu$. Such a LCS array is available commercially from Displaytech Inc. of Boulder, Colo. The arrangement displayed for the liquid crystal shutters in FIG. 3 is consistent with the brick-like LCS organization.

The operation of the printer engine of FIGS. 1 and 2 can be summarized as follows: The data to be printed on a page is already stored in memory 20 which may be a computer memory such as a disk. Memory 20 shifts shutter (open and closed) data into LCS array 19. Mirror 24 directs the resulting light pattern to a linear segment of area face 18 of the fiber optic bundle for exposing medium 12 to a discharge pattern. Memory 20 shifts a next subsequent pattern into LCS array 19. Meanwhile, mirror 24 rotates to a position corresponding to the next linear segment of area face 18 and medium 12 moves perpendicular to the linear array of pixels. The process repeats until the entire stored image is recorded on medium 12.

By virtue of encoding the mechanical motion of the mirror to provide y-axis address information, the arrangement operates as an all-digital printer engine.

If we assume that LCS array 19 comprises a ferroelectric liquid crystal shutter (FE-LCS) the state of the art time to switch the shutter is 10 $\mu$s or less in a nonmultiplexed configuration such as is used here. In normal operation of shutters of this type, voltage is applied and the shutter begins to open at 5 $\mu$s. At 10 $\mu$s, the shutter is fully open and exposure has begun. At 20 $\mu$s, a pulse is applied to close the shutter; the shutter begins to close at 25 $\mu$s and exposure is over at 30 $\mu$s. During the period of from 5 $\mu$s to 30 $\mu$s, the shift register (memory 20) is filled with new data. The cycle is then repeated providing an effective exposure time of more than 15 $\mu$s, although the shutter may remain open for several periods (exposure times).

The shift register includes 128 elements for one row of LCS array 19. Thus, the data rate is about 5 MB/s. The necessary exposure energy passing out of the FE-LCS array is 2.4 $\mu$ watts per pixel during 15 $\mu$s exposure. The energy incident on the shutter continuously is about 10 $\mu$ watts per pixel. The pixel footprint is 50 $\mu$ on a side and the pixel area is $2.5 \times 10^{-5}$ cm$^2$. Thus, the continuous incident optical power density is about 1 watt/cm$^2$. The FE-LCS can sustain an energy density of about 4 watts/cm$^2$. The required continuous optical power incident on the shutter is 2.6 m watts. The required optical power from the lamp is about 0.2 watts. A 100 watt Tungsten filament operated at 3200 degrees k has adequate brightness to produce this even with filtering.

The shift register driver chips for the shutter can be attached directly to LCS array 19 as shown in FIG. 3.

The description has been rendered in terms of a LCS shutter arrangement. Other arrangements also can be used such as light emitting diodes (LED's), magneto-optic light valve and edge-emitting, thin film, electroluminescence devices (EE-TF-EL). Of these, LED and magneto-optic devices are already being used in existing printer engines and are useful for printer engines in accordance with the principle of the present invention also.

The suitability of such alternative devices herein is underscored by the following illustrative calculations: We will assume an exposure value requirement of 5 ergs/cm$^2$ which translates into $3.6 \times 10^{-11}$ J/pixel. The transmission factor, TF, for a Lambertian emitter such as LED can be shown to be $$TF = [4F^2(1 + 1/M)^2 + 1]^{-1}$$

in which F is the F-number of the lens and M is the linear magnification, i.e. the linear dimension of the spot in the plane of the fiber array divided by the linear dimension at the emitting array.

As a matter of interest, since the size of the LED array element is potentially a variable, one should consider the implications of that choice. The spot size on the fiber is fixed. Thus, M is the variable. The energy available from the array element at constant brightness is proportional to its area. Thus, $M^{-2}$ is the available energy variable. The energy transmitted to the fiber at constant brightness is, thus, $$\text{Energy} \propto M^{-2}/[F^2(1 + 1/M)^2 + 1] = 1/[F^2(M+1) + M^2/4]$$

The transmitted energy decreased monotonically as M increases i.e. as the source pixel gets smaller. See Table 1. In the limit of a large source, M→0, and the energy transmitted has the maximum value of $1/F^2$.

The consideration above is valid so long as the effective numerical aperture of the lens is less than that of the fiber. The maximum possible value for the effective lens numerical aperture is $$NA \leq 1/(1+F^2)^{\frac{1}{2}}$$

which is the case when M=0. Since the fiber, NA$\approx$0.5, for this case (M=0) the effective NA of the lens is still less so long as F>1.732. For M=1 F>$(\frac{3}{4})^{\frac{1}{2}}$ insures that the effective lens NA is smaller.

It is interesting to note that at constant source brightness, the energy transmitted to the fiber increases with source size. On the other hand, the optical and electrical power required, speed, cost etc. favor small source size (within limits). The lowest practical limit corresponds to M=1, where the energy transmitted is proportional to $1(4F^2+1)$. This is a factor of 4 lower than for the large source case.

TABLE 1

| F | EXPOSURE FACTOR M | | | | |
|---|---|---|---|---|---|
| | 0 | 0.1 | 0.5 | 1 | 2 |
| 1 | 1 | 0.82 | 0.43 | 0.24 | 0.10 |
| 1.5 | 0.44 | 0.37 | 0.20 | 0.11 | 0.05 |
| 2 | 0.25 | 0.21 | 0.11 | 0.06 | 0.03 |
| 2.5 | 0.16 | 0.13 | 0.07 | 0.04 | 0.02 |
| 3 | 0.11 | 0.09 | 0.05 | 0.03 | 0.01 |

EXPOSURE FACTOR = $1/[F^2(M + 1)^2 + M^2/4]$

In one practical arrangement, there are two rows of LEDs, perhaps 128 in each row, so that there are a total of 256 pixel addresses covering 90 fibers in a linear segment of the area face of the bundle. The LEDs are driven on the two sides in a 1×256 configuration (i.e. no multiplexing). When the linear segments are scanned vertically, there will be about 100 address positions covering about 30 fibers in a column. This provides enough spatial coverage for about 2700 fibers. The linear dimension of the LED is about equal to the fiber diameter, i.e. 85 microns. We want this to be about 28.33 microns in the image plane. Thus, the magnification is 28.3/85=0.333. Assuming an F:2 lens, the transmission factor is 0.02. For a large pixel, say four times larger, the magnification is 0.1 and the transmission factor is $2.1 \times 10^{-3}$ or 10 times lower. However, the available energy is at least 16 times greater. Hence, we gain a factor of almost two by using larger LEDs. The actual gain from using larger LEDs may be much greater. Large LEDs offer substantial opportunities for improving brightness. The maximum line time is 3 ms corresponding to a 10 second page print time. Thus, 30 μs is available to achieve the necessary exposure.

The necessary power out of the LED is 60 μwatts. With reflection losses of about 15% this requirement becomes 70 μwatts. We assume that the LED emits 20 μwatt/ma. This corresponds to a power efficiency of about 1.3%, typical of small, diffused-junction LED arrays in GaAlAs. Thus, the drive current requirement is 3.5 ma to achieve 70 μwatts. This is a reasonable drive current for such a small LED. The LEDs tend to saturate with increasing drive current. On the other hand, there are 256 LEDs driving 2550 (nominally 2700) fibers. Thus, each LED is used 9 times in each frame on the average. The duty cycle is, therefore, 270 μs/3000 μs=0.09 under the assumption of uniform usage. Overheating is not a problem because the average drive current is only 0.3 ma.

In presently available high speed LED line printers, the LED on time is probably of order 60 μs. The exposure requirement is the same. The NA of a suitable selfoc lens array is 0.1–0.2 at best. Thus, the energy transmission factor can be estimated to be less than 0.04 and probably comparable to the value assumed for the printer of 0.02. Therefore, the LED approach also appears feasible, the trade off being the extra cost and drive current requirements of the large LED array versus the smaller number of LEDs required.

The initialization procedure for the optical subassembly of the printer engine of FIGS. 1 and 2 is directed at determining the addresses of light imposed on the area face 18 of the fiber optic bundle and the relationship between those addresses and the pixels exiting the linear face 17 of that bundle. In the absence of the establishment of such relationship, light patterns directed at the area face will be scrambled at the linear face. In accordance with the principles of the present ivention, no two-dimensional, addressable, light-generating means such as a CRT is present. Instead, a linear, light-generating means is made two-dimensional by rotating a mirror which sweeps an image of a linear array of light-generating means onto consecutive linear segments of the area face of the fiber optic bundle, the light patterns being changed "on the fly."

In operation of the illustrative optical subassembly, eigh bits (x axis bits) of a sixteen bit address code are supplied by an address register (not shown) which is part of the linear LCS array 19. The other eight bits (y axis bits) are supplied by sensor 60 and mask 61 to correspond to the angular orientation of mirror 24. In an arrangement where mirror 24 of FIG. 1 is an elongated polygon as shown in FIG. 3, for example, and motor 26 of FIG. 1 is a stepper motor, the mirror can be maintained in consecutive fixed positions during an initialization procedure. In this instance, the relationship between the pixel positions in the linear end and those addresses are determined during the initialization procedure by opening all light valves of LCS array 19 and by directing light through all the open shutters to a linear segment of the area face. While light is incident on all of the instant linear segment, a hooded sensor with a transparent slit is moved along the linear face of the bundle in increments small compared to a fiber diameter. In this manner, all slit positions for which maximum intensity peaks occur for that linear segment (i.e. see FIG. 2) are obtained. The light valves remain on and the process is repeated for the next linear segment. The process continues until all the linear segments are exposed. At this juncture in the initialization procedure, all the maximum intensity positions and associated addresses are known but not in the order in which they have to occur to correspond to the order of the pixels desired at the linear face of the bundle. This relationship can be understood by an examination of the interleaved fibers shown in FIG. 2.

The proper sequence for those addresses is obtained by opening shutter only those shutters (LCS's) of array 19 at addresses (x and y) which correspond to one of the maximum intensity positions previously obtained one at a time while the hooded photosensor is in one of the consecutive maximum intensity positions. The address for which light exits at the photosensor position is recorded in each instance as described above. It takes about 100 ms to move the hooded photosensor to a new fiber (pixel) position and scan the mirror. Thus, the total line time is 255 seconds for 2550 fibers.

The physical organization of the illustrative optical subassembly permits illumination, by a separate source, of the entire area face of the fiber optic bundle at the same time rather than by illumination of only one linear segment of the area face at a time. The illumination of the entire face at the same time allows all the maximum intensity positions and related addresses to be obtained with a single scan of the linear face by the hooded photosensor. For the illustrative system where one hundred y-axis positions are used, the illumination of the entire area face reduces the scan time by a factor of one hundred.

Figure 6:
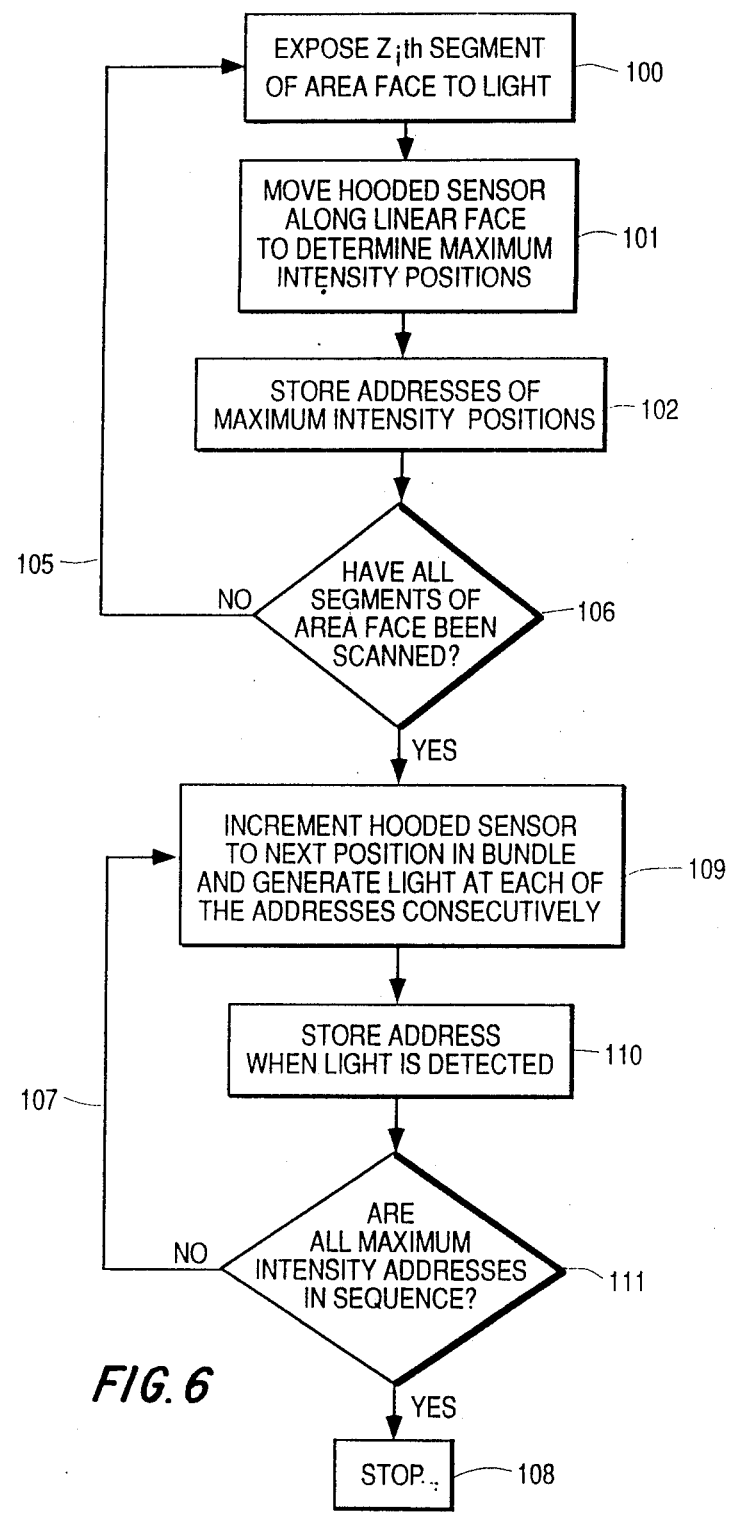
FIG. 6 is a flow diagram of procedure for initializing the optical subsystem of the printer engine of FIGS. 1 and 2.

FIG. 6 shows a flow diagram of the initialization procedure where the linear face is scanned by the hooded photosensor each time a linear segment of the area face is illuminated. Block 100 indicates that a linear segment of the area face is illuminated. Block 101 indicates that the hooded sensor is moved to determine all addresses at which maximum light intensity occurs. Block 102 indicates that those addresses are stored. This procedure is repeated until light has been generated at all linear segments as indicated by arrow 105. It is helpful to remember that there are about ten addresses at the light generating end of the optical subassembly to correspond to each fiber. The sensor selects the set of addresses, amongst the ten for each fiber, at which the maximum intensity occurs. It is also helpful to observe from FIG. 2 that the addresses at which maximum intensity occur in one linear segment of the area face are interleaved with the addresses from other segments.

After all linear segments are scanned by the photosensor as indicated by block 106, the addresses of maximum intensity positions are placed in a sequence to correspond the sequence of pixels in the linear face of the fiber optic bundle. This is accomplished by moving the slit (photosensor) to a now known position of maximum light intensity and, while the photosensor is in that position, generating light consecutively at all the addresses determined by the above procedure until the photosensor detects light. The photosensor is then moved to the next consecutive position where maximum light intensity occurred and the procedure is repeated as indicated by arrow 107. When all elements at which maximum intensity light is generated are in sequence, the initialization procedure stops as indicated by block 108. The scrambled addresses at which maximum light intensity occurred are now in an ordered sequence corresponding to the desired ordered sequence of the maximum light intensity (pixels) in the linear face of the bundle. The ordering procedure is represented by blocks 109, 100, and 111 of FIG. 6.

Figure 7:
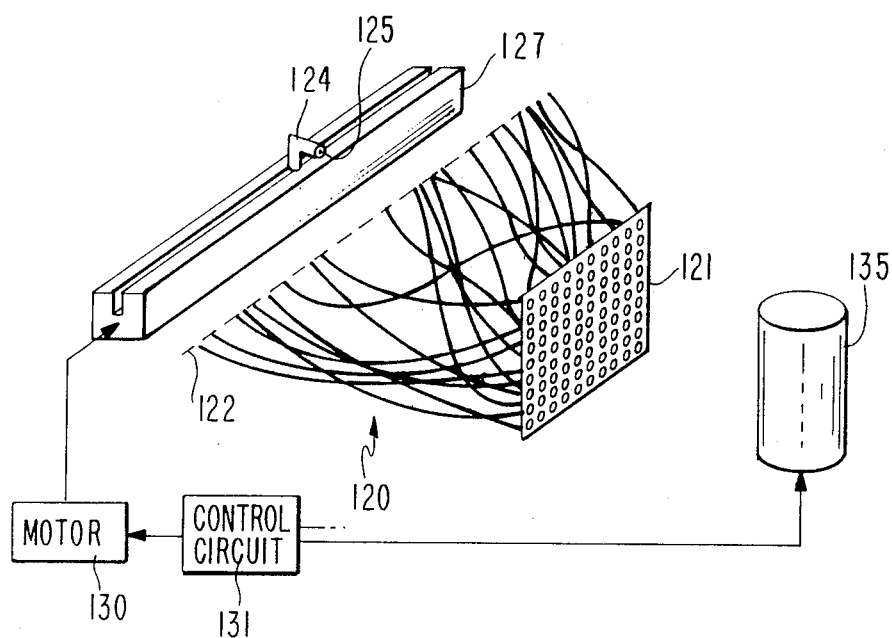
FIG. 7 is a representative block diagram of apparatus used for performing the method represented in FIG. 6.

FIG. 7 shows an arrangement for carrying out the initialization procedure. The fiber optic bundle 120 again extends from an area face 121 to a linear face 122 as in FIG. 1. A photosensor 124 covered with a hood having a slit 125 is moved along track 127. The incremental movement of the sensor is carried out by a motor 130 under the control of control circuit 131 which may be control circuit 21 of FIG. 1. Control circuit 131 typically comprises a relatively fast computer programmed for the initialization procedure operation. A much less sophisticated control circuit can be used for the finished printer. The control circuit (131) is operative, as is control circuit 21 of FIG. 1, to contro the light generating means LCS 19 (or LED equivalent), the liquid crystal shutters, and mirror 24 and to synchronize the operation of the light-generating means with the movement of sensor 124 along track 127. FIG. 7 also shows a lamp 135 for illuminating the entire area face of the fiber optic array if required by the chosen initialization procedure.

The image of the linear LCS light valve (LV) array (19 of FIG. 3) is scanned mechanically by a rotating polygon (24) across the area face 18 of the fiber optic bundle as described above. Particular shutters in the linear array are turned on to transmit light into particular fibers. The image of the linear array scans at approximately constant velocity across the area face (18) of the fiber optic bundle. An index light source at the end of the linear LCS array generates timing signals from a transmission grid photodetector in the plane of the area face of the fiber optic bundle immediately adjacent to the fiber array. In response to the timing signals, the system turns on the particular pixels in the row at just the right time to excite the appropriate fibers. The incoming pixel stream is reordered so as to produce pixels at the right position in the written line on the photosensitive medium. The indexing light source (shutter) is designated 200 in FIG. 3. The photodetector is designated 201 and the timing signals are designated 202. Polygon 24, in one specific embodiment is a 20 facet, 38 mm radius mirror arrangement and lens 76 is a 50 mm, F/3.1,1:1 focussing lens.

In a typical scan configuration, there are at least 100 linear segments and 256 elements in the segment (and the segments may overlap). Thus, there are for any segment on average, about 25.5 elements thar are in the correct position to excite a fiber. Each segment is in its position for 25 μs. The 100 segments are executed in time sequence with no dead time. Thus, the time to write a linear segment of the page is 2.5 ms with a cycle time of 3 ms to cover (inter-facet) dead time in the polygon. With 3300 linear segments, it takes about 10 seconds to write a page. In a typical design, a polygon with 20 sides performs the scanning. The time for one complete turn of the polygon is 60 ms corresponding to 1000 revolutions per minute. Each pixel in the linear array is turned on every 10 rows on average or about 10 times during exposure cycle. Thus, 256 light sources write into 2550 fibers. The timing is consistent with 6 pages per minute.

Groups of fibers in the fiber linear array emit light simultaneously. There is not a progressive sequence of light spots for exposing the pixels as in a flying spot (CRT) scanner. As a result there is the possibility that two adjacent fibers in the linear array would not be excited with a non trivial time gap as mentioned above. With a continuously moving photosensitive medium, the pixels would exhibit small, random vertical displacements from a straight line, never more than one pixel. These displacements repeat from line to line so there would be a small tear between some vertical lines. This would be undesirable. Fortunately, the distance between two fibers in the area face which are adjacent in the linear face is typically a small fraction of the length of the fiber optic bundle, area array side. Thus, the time lapse in writing the two adjacent fibers in the linear array face is at most a small fraction of the time to write a horizontal line. During this time the photosensitive medium moves a distance equal to the height of one pixel. Consequently, the vertical displacement of adjacent pixels and the related tear is never more than a small fraction of the pixel height. On the other hend, if the photosensitive medium is moved stepwise during the dead time of the polygon and is held stationary during the writing period, then all pixels fall on the same straight line. Based on simulations, the small vertical displacements that occur with a continuously moving medium are not observable and it is not expected that step motion will be necessary.

The reason that fiber ends in the area face of a fiber optic bundle, which have adjacent ends in the linear face, actually end up in closely-spaced (although random) positions is a result of the manufacturing procedure for the fiber optic bundle. Optical fibers are drawn and captured on a drum in a manner well understood in the art. A fiber optic bundle is made from these captured fibers by placing an adhesive tape across the fibers, say every foot along the drum and by cutting the fibers at the tape. The fibers thus, are captured in a linear arrangement at one end and just hang at the other.

The LCS array is controlled by dedicated drivers; it is not multiplexed. The elements comprise a special, high speed liquid crystal shutter with cross polarizers. Typical contrast ratio exceeds 500:1. Since there are on average five LCS elements potentially illuminating each fiber core, a non excited fiber receives about 5 time the dark output of one element. So the actual contrast ratio of the emission into the fiber is about 100:1.

The excitaion wave form is a $+15$ v pulse for black and a $-15$ v pulse for white. The light turn-on and turn-off is delayed by about 7 $\mu s$ and the 10 to 90% rise time is also about 7 $\mu s$. Thses parameters are voltage and temperature dependent so the voltage and temperature of the cell are controlled. Because of the rise time, the 25 $\mu s$ light pulse is roughly bell-shaped with a flattened top, thereby slightly reducing the available light. This further reduces the contrast ratio, but not by much, perhaps 20%. The shutter without polarizers has an absorption loss of $\frac{1}{2}$% and can handle a kilowatt/$cm^2$ of optical flux. However, even with a polarizer/cell sandwich and no cooling, the rated incident optical power capability is 4 watts/$cm^2$.

The total flux in the pulse can be varied by controlling pulse width or height, so gray scale is inherient. Gray scale also can be achieved by time modulation.

Color can be achieved by putting three linear fiber arrays together in parallel in the same fiber optic bundle using separate drive sources. The fiber lines are spaced by one pixl height. The color for three adjacent lines are written simultaneously with appropriate delay so that they superimpose on the photosensitive medium. Because of the geometry, registration is automatically achieved. There is no writing time penalty i.e. the rate is still 5 or more pages per minute. Another option is to use time sequential color with stepped motion of the medium. An initialization procedure for color embodiments requires, for example, three consecutive procedures, one for each color with light of red, green and blue, where each procedure is analogous to that described above. The procedures also may be carried out by using a color wheel.

Although the invention has been described in terms of a linear array of light sources and a mirror, it should be clear that a matrix array can be used in a row by row mode to achieve the equivalent operations. Also, one or more linear array of light sources can be imaged onto an area face of a fiber bundle which is in the shape of an annulus where the images are rotated by, for example, a Dove Prism to move from (radial) segment about the annulus.

What is claimed is:

1. A combination comprising a plurality of light conduits having the ends thereof arranged in a linear array in a first face and in an area array in a second face having first and second axes and a plurality of linear segments parallel to said first axis, light source means for generating a plurality of light elements simultaneously along each of said linear segments of said area face aligned with said first axis and digital means for controlling the presence or absence of said light elements at said linear segments along said second axis of said area face each of said linear segments extending across said area face along said first axis.

2. A combination in accordance with claim 1 wherein said light source means comprises linear means for generating said plurality of light elements and digital means for directing said light elements at consecutive ones of said linear segments.

3. A combination in accordance with claim 2 wherein said light source means comprises a linear LCS multidevice light valve (LCS-LV), and memory means for shifting into said LCS-LV data for controlling the open or shut states for the shutter elements therein.

4. A combination of elements in accordance with claim 3 wherein said means for controlling a plurality of light elements comprises mirror means for reflecting light from said LCS-LV to said area face and means for rotating said mirror means controllably for directing reflected light to said consecutive linear segments.

5. A combination in accordance with claim 2 wherein said means for controlling said light elements includes control means for rotating said mirror to produce consecutive images along said second axis corresponding to said linear segments.

6. A combination in accordance with 2 wherein said plurality of light conduits comprises a fiber optic bundle including fibers arranged randomly in a two-dimensional arrangement of S fibers along said first axis and T fibers along said second axis, wherein said linear means comprises N devices where $N>>S$, said combination also including second-axis control means for controlling said means for controlling such that light from linear means is directed at a number, Z, of consecutive linear segments where $Z>>T$.

7. A combination in accordance with claim 6 wherein $Z \cdot N$ is ten or more times greater than $S \cdot T$.

8. A combination in accordance with claim 2 wherein said light conduits comprise a fiber optic bundle, said combination also including a photosensitive medium coupled to said linear face and responsive to light patterns issuing from said fiber ends in said linear face for forming an image on the photosensitive medium.

9. A combination in accordance with claim 8 wherein said photosensitive medium comprises an electrostatic medium with associated toner, transfer and fixer stations for forming an image on plain paper.

10. A combination in accordance with claim 8 wherein said photosensitive medium comprises photographic paper.

11. A combination in accordance with claim 2 wherein said light conduits comprise a fiber optic bundle, wherein said light source means comprises means for directing light at said linear means, and said linear means comprises light shutter means for controllably occluding said light.

12. A combination in accordance with claim 8 also including a light source for directing light at said linear means and light shutter means for controllably occluding said light.

13. A combination in accordance with claim 6 wherein said linear means comprises an LED and said means for directing comprises mirror means responsive to coded signal for moving said mirror to direct light to said linear segments.

14. A combination in accordance with claim 2 wherein said linear means comprise a plurality of LCS light valves arranged in first and second rows offset from one another.

15. A combination in accordance with claim 2 also including sensor means for sensing the one of said linear segments illuminated and means responsive to said sensor means for providing a coded representation for y-axis position of the illuminated linear segment in each instance.

16. Apparatus for initializing an optical system comprising a fiber optic bundle which has the ends of the fibers arranged in a linear array in a first face and in an area array in a second face and which has a linear arrangement of light sources operative to direct a light pattern at consecutive linear segments of said area face, said apparatus comprising sensor means and means for moving said sensor means incremently along said linear face each time said light pattern in moved to a next one of said consecutive linear segments, means for storing addresses of each light source and the instant linear segment position at which maximum light intensity is observed, means for moving said sensor to consecutive ones of said positions at which maximum light intensity occurs, and means for generating light at consecutive addresses with which maximum intensity light was associated each time said sensor is moved to a next position.

17. A method for initializing an optical system comprising a fiber optic bundle which has the ends of the fibers arranged in a linear array in a first face and in an area array in a second face and which has a linear arrangement of light sources operative to direct a light pattern at consecutive linear segments of said area face, said method comprising the steps of obtaining the addresses of all of said light sources for which maximum-intensity light position is indentified in said first face, and determining the order of said addresses to correspond to the order of said positions in said first face.

18. A method in accordance with claim 17 wherein said step of obtaining includes the steps of maintaining a light pattern along a selected linear segment of said face, moving a sensor from position to position along said first face, generating light sequentially from said light sources for which maximum intensity light positions previously occurred and which have an address which matches that of said linear segment and repeating said steps for each of a series of consecutive linear segments until the entire second face is completed.

19. A method in accordance with claim 18 wherein said step of determining the order comprises moving a sensor to each of said succession of maximum-intensity positions along said first face and generating light consecutively from the light sources the addresses of which correspond to maximum intensity positions for each position of said sensor.

20. Apparatus comprising a fiber optic bundle, said bundle having the ends of the fibers therein arranged linearly in a first face, said bundle having the opposite ends of said fibers arranged in an area array in a second face, means for projecting an image of an array of light sources on correspondingly shaped segments of said area face, means for moving said image through a sequence of said segments covering the entire area of said second face, means for changing the light pattern from said array of light sources for each of said segments and means for synchronizing the means for moving and the means for changing in a manner to organize pixels in said linear face for faithfully reproducing said image of said area array of light sources at said first face.

21. Apparatus in accordance with claim 20 wherein said array of light sources is a linear array and said correspondingly-shaped segments of said area face are linear segments.

22. Apparatus in accordance with claim 21 wherein the image of said array of light sources extends across one dimension of said area face, said apparatus include digital means for moving said image from one of said linear segments to a next linear segment.

* * * * *